United States Patent [19]

Wu

[11] Patent Number: 5,036,142

[45] Date of Patent: Jul. 30, 1991

[54] PROCESS FOR MAKING ELECTRO-OPTICALLY ACTIVE POLYMERS

[75] Inventor: Chengjiu Wu, Morristown, N.J.

[73] Assignee: Allied-Signal Inc., Morris Township, Morris County, N.J.

[21] Appl. No.: 456,419

[22] Filed: Dec. 26, 1989

[51] Int. Cl.$^5$ .................................................. C08F 8/34
[52] U.S. Cl. ................................ 525/348; 525/329.4; 525/330.4; 525/330.5; 525/333.5; 525/333.6; 525/333.7; 525/333.9; 525/349; 525/375; 525/376
[58] Field of Search ................ 525/349, 348, 375, 376

[56] References Cited

U.S. PATENT DOCUMENTS

| | | | |
|---|---|---|---|
| 3,230,087 | 1/1966 | Sus et al. | 525/371 |
| 3,625,919 | 12/1971 | Kamogawa et al. | 525/376 |
| 4,579,915 | 4/1986 | Choe . | |
| 4,603,187 | 7/1986 | Choe . | |
| 4,605,869 | 8/1986 | Choe . | |
| 4,607,095 | 8/1986 | Kuder . | |
| 4,694,048 | 9/1986 | Choe . | |
| 4,707,305 | 11/1987 | Choe et al. . | |
| 4,728,576 | 3/1988 | Gillberg-LaForce . | |
| 4,732,783 | 3/1988 | Choe et al. . | |
| 4,755,574 | 7/1988 | Choe . | |
| 4,757,130 | 7/1988 | DeMartino . | |
| 4,767,169 | 8/1988 | Teng . | |
| 4,773,743 | 9/1988 | Choe et al. . | |
| 4,774,025 | 7/1988 | Choe et al. . | |
| 4,779,961 | 10/1988 | DeMartino . | |
| 4,795,664 | 1/1989 | DeMartino . | |
| 4,801,659 | 1/1989 | Leslie . | |
| 4,801,670 | 1/1989 | DeMartino . | |
| 4,804,255 | 2/1989 | Choe . | |
| 4,807,968 | 2/1989 | DeMartino et al. . | |
| 4,808,332 | 2/1989 | DeMartino et al. . | |

FOREIGN PATENT DOCUMENTS

| | | |
|---|---|---|
| 205734 | 12/1986 | European Pat. Off. . |
| 214828 | 3/1987 | European Pat. Off. . |
| 231770 | 8/1987 | European Pat. Off. . |
| 235506 | 9/1987 | European Pat. Off. . |
| 243806 | 11/1987 | European Pat. Off. . |
| 243807 | 11/1987 | European Pat. Off. . |
| 262680 | 4/1988 | European Pat. Off. . |
| 265921 | 5/1988 | European Pat. Off. . |
| 271730 | 6/1988 | European Pat. Off. . |
| 287093 | 10/1988 | European Pat. Off. . |
| 300419 | 1/1989 | European Pat. Off. . |
| 301411 | 2/1989 | European Pat. Off. . |
| 304051 | 2/1989 | European Pat. Off. . |
| 306893 | 3/1989 | European Pat. Off. . |

*Primary Examiner*—Bernard Lipman
*Attorney, Agent, or Firm*—Gerhard H. Fuchs; Richard C. Stewart

[57] ABSTRACT

The invention provides a method for making optionally active polymers having a carbon-to-carbon backbone chain and pendant "transducer" groups having an azo linkage which involves azo-coupling, in homogeneous solution, a carbon-to-carbon backbone polymer having pendant groups terminating in an aromatic group with an aromatic diazonium salt, and recovering the resultant reaction product.

7 Claims, No Drawings

PROCESS FOR MAKING ELECTRO-OPTICALLY ACTIVE POLYMERS

CROSS REFERENCE TO RELATED APPLICATION

This application is related to commonly assigned, copending U.S. Appl. Ser. No. 456,420, filed Dec. 26, 1989, by Wu et al. for "Electro-Optical Materials and Light Modulator Devices Containing Same".

FIELD OF THE INVENTION

This invention relates to the field of electro-optically active polymers, and more particularly to a process for forming such polymers by attaching an electro-optically active azo "transducer" group to an amorphous carbon-carbon backbone chain polymer.

BACKGROUND OF THE INVENTION

Electro-optically active polymers having pendent aromatic azo-type "transducer" groups can be made by free radical polymerization of monomer having terminal vinyl groups and containing the aromatic azo-type transducer groups. However, it has been found that polymerization yield and the molecular weight of the polymer decrease with increasing amount of transducer groups in the polymer. This is explainable by the chain transfer character of the electron-withdrawing group substituted phenyl ring. Minimization of initiator concentration and lowering of polymerization temperature to increase polymer molecular weight results in lower conversions and impractically long polymerization time. For homopolymers of these monomers containing azo-type "transducer" groups, the molecular weight of the polymer obtained by that route is usually less than about 20,000; the polymer is brittle and difficult to fabricate into useful light modulating devices. Furthermore, the vinyl monomer containing an aromatic azo-type "transducer" with a particular substituent, such as those bearing a hydroxyl group on the aromatic ring, cannot be easily made without the protection of the hydroxy group and the monomer, when finally made, cannot be polymerized by conventional radical method.

The present invention provides a novel method for making high molecular weight polymers having high contents azo-type "transducers" which avoids these difficulties, and thus is capable of providing useful polymers of this type which are inaccessible from the monomer approach.

SUMMARY OF THE INVENTION

A method is provided for making optically active, especially electro-optically active polymers composed of a carbon-carbon backbone chain having pendant "transducer" groups which give it its optical activity, which comprises reacting, in homogeneous solution, a polymer having the general composition (I) [terminal moiety]-[linking moiety]-P wherein
(a) P represents a polymeric carbon-carbon backbone chain having the structure

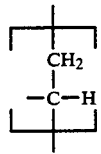

and

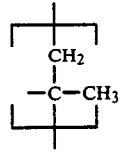

(3) units of (1) or (2), above, copolymerized with
(i) alkyl acrylate wherein the alkyl moiety contains from about 1-5 carbons,
(ii) alkyl methacrylate wherein the alkyl moiety contains from about 1-5 carbons,
(iii) acryl amide,
(iv) methacryl amide, and
(v) styrene;
(b) the linking moiety is
(1) $-(CH_2)_m-$,
(2) $-(CH_2)_m-O-$
(3)

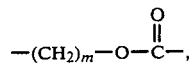

(4) $-(CH_2)_m-O-CH_2-$ or
(5)

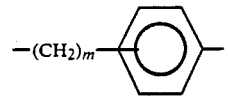

wherein m is an integer of from about 1-20; and
(c) the terminal moiety is

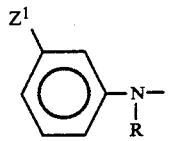

wherein
(1) $Z^1$ is H or OH,
(2) R is
(i) H,
(ii) alkyl, straight chain, branched or cyclic, having 1-20 carbon atoms,
(iii) $-C_nH_{2n}OH$ wherein n is an integer of from about 1-20, or
(iv) an alkylene bridging group having 2 to 4 carbon atoms connecting the N atom to the o- position of the aromatic ring to which the N atom is attached, with a diazonium salt having the general formula

wherein (a) X is
(1) —NO$_2$,
(2) —CN,
(3) —COOR$^3$ wherein R$^3$ is alkyl, straight chain, cyclic or branched having 1-20 carbon atoms,
(4) —CH=C(CN)$_2$, or
(5) —C(CN)=C(CN)$_2$;
(b) Ar is selected from the group consisting of

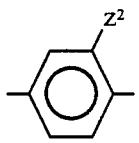 (1)

wherein Z$^2$ is
(i) —H,
(ii) —OH, or
(iii) alkyl, straight chain, branched or cyclic, having from about 1-20 carbon atoms,

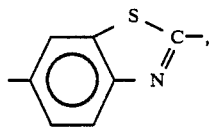 (2)

or

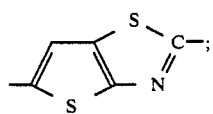 (3)

(c) A$^-$ is the conjugate base of an organic strong acid or superacid HA which is:
(1) substituted sulfonic acid R$^5$SO$_3$H wherein R$^5$ is
(i) —CH$_3$,
(ii) —CH$_2$(CF$_2$)$_n$F wherein n is an integer of from about 1-10, or
(iii) —(CF$_2$)$_n$F wherein n is an integer of from 1-10;
(2) substituted benzenesulfonic acid

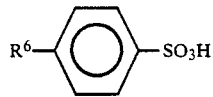

wherein R$^6$ is
(i) —CH$_3$,
(ii) —Cl,
(iii) —Br, or
(iv) —NO$_2$;
followed by recovering the desired reaction product from the reaction mixture.

The desired reaction product will have the general formula

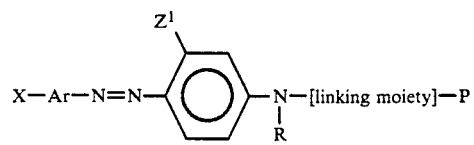

wherein X, Ar, Z$^1$, R, [linking moiety] and P have the above stated meanings.

The reaction is critically carried out in homogeneous solution, in an aprotic polar solvent or else the desired soluble product is not obtained; or it is contaminated by products of side reactions; or it is cross-linked; or the coupling reaction is substantially incomplete because of precipitation of the polymeric reactant.

Suitable aprotic solvents include:
(1) nitriles, such as acetonitrile and benzonitrile;
(2) amides, such as acetamide, N,N-dimethylacetamide, N,N-dimethylformamide, N-methylpyrrolidinone, and hexamethylphosphoramide;
(3) ethers, such as monoglyme, diglyme, triglyme, dioxane, and tetrahydrofuran;
(4) halobenzenes, such as chlorobenzene, dichlorobenzene, and trichlorobenzene;
(5) sulfoxides, such as dimethylsulfoxide;
(6) esters, such as ethyl acetate, butylacetate, and methyl benzoate, and
(7) nitrobenzene.

Recovery of the desired reaction product from the reaction mixture may, for example, be accomplished by pouring the reaction mixture into a non-solvent for the desired product, such as methanol or ethanol, to precipitate the product, followed by separation, as by centrifugation or filtration, and washing and drying if desired.

The desired product is obtained in high yield of good purity. Typically, the coupling is essentially complete, say at least about 80 percent complete, more usually at least about 90 percent complete, if the diazonium salt reactant is used in slight excess of stoichiometrically required amount.

DETAILED DESCRIPTION OF THE INVENTION

This invention provides a facile method for making optically active, especially electro-optically active, polymeric media which are composed of an amorphous polymer having pendant molecular entities (herein referred to as "transducers") which give these polymers their optical activity properties. These polymers will ordinarily be used in thin film form, typically as obtained by spin casting, and they can be fabricated into light modulator devices, especially optically active waveguides, particularly electro-optically active waveguides.

The starting polymers of formula (I), above, are obtained utilizing routine reactions and polymerization procedures, as is illustrated by the exemplary reaction routes set forth below:

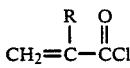

can be reacted with

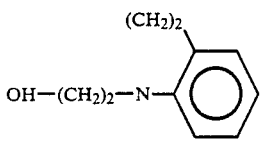

to form

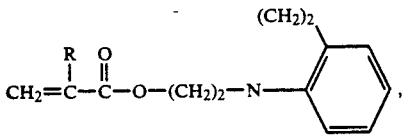

which in turn can be polymerized using a free-radical initiator to form a polymer, typically having weight averaged molecular weight in excess of 50,000, of the composition

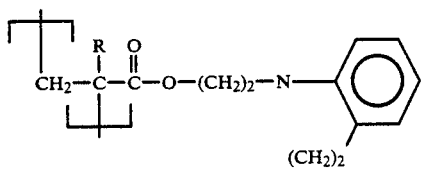

wherein R is H or $CH_3$.

Similarly,

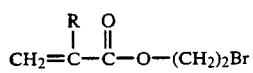

can be reacted with

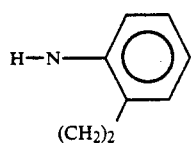

to obtain the monomer as above.

An exemplary alternative route to the starting polymers of formula (I), above, involves first forming a polymer having pendant linking moieties, such as

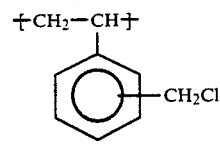

and then coupling it to a suitable terminal moiety, as by reacting it with

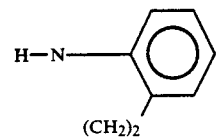

to form a starting polymer of the formula

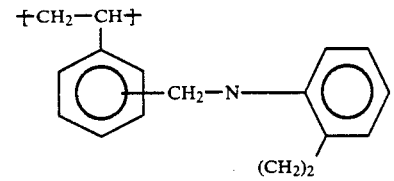

to which the $-N=N-Ar-X$ moiety can be affixed by the method of the present invention. As stated, the production of the starting polymer utilizes conventional procedures. Depending on the route by which the starting polymer is obtained, suitable conventional recovery and purification procedures will furnish the material of sufficient purity for use in the following azo coupling reaction.

The diazonium salt reactants of the formula $X-Ar-N_2^+A^-$ wherein X, Ar and A have the aforestated meanings can be obtained, as is conventional, by dissolving the substituted anilines $X-Ar-NH_2$ with about 3 equivalents of organic strong acid, specifically any of the above-mentioned acids—preferably triflic acid, p-toluenesulfonic acid or methanesulfonic acid—in anhydrous polar solvent, such as methanol or ethanol, diazotizing it with about 1-1.1 equivalents of an alkylnitrite, such as isoamylnitrite, under cooling at temperature below about 0° C., followed by precipitation of the diazonium salt with a less polar solvent, such as ether. The diazonium salt can be further purified, if desired, by ethanol-ether re-precipitation.

As previously stated, the azo coupling reaction of the present invention is conducted in solution under homogeneous conditions. Suitable solvents have been listed above. The polar aprotic solvent should dissolve the reactant polymer, the resultant azo coupled polymer and the diazonium salt. A guiding rule for selecting the solvent is that the solubility parameter value of the solvent should lie between those of the reactant polymer and the resultant polymer, so that both polymers extend relatively evenly in the solvent. Solubility parameter can be calculated by conventional group contribution methods. Specific examples of preferred solvents include N,N-dimethylacetamide, N,N-dimethylformamide, benzonitrile, nitrobenzene and dichlorobenzene; N,N-dimethylacetamide and N,N-dimethylformamide are most preferred.

The concentration of the reactants in the solvent wherein the azo coupling reaction takes place is not critical, provided solubility limits are not exceeded and homogeneity of solution is maintained throughout.

The azo coupling reaction temperature is maintained within the range of from about $-60°$ to about 0° C. preferably between about $-30°$ to about $-10°$ C. At temperatures below about $-60°$ C., the solvent may freeze, the solubility of reactants decreases, and the coupling reaction is unnecessarily slow.

At temperatures above about $-0°$ C., decomposition of the diazonium salt and violence of the reaction may result in cross-linking or side product contamination. Desirably, the reaction is carried out under suitable agitation. Within the above-stated temperature ranges, reaction times generally are in the order of from about 1 to about 64 hours. Completion of the reaction is observed by the absence of diazonium salt which can be detected by conventional methods.

After completion of the reaction, the desired azo coupled polymer product can be recovered form the reaction mixture using standard procedures. A convenient method involves pouring the reaction mixture into methanol, which precipitates the desired product.

The degree of polymerization of the starting polymer and of the resultant polymer remain the same, indicating no backbone chain scission in the coupling process.

The present invention is further illustrated by the following examples, which set forth the best mode presently contemplated by me for its practice.

EXAMPLE 1

Polymer of 2-N-indolinoethyl methacrylate

A solution of 12 parts of 2-N-indolinoethyl methacrylate and 0.046 part (0.2 mole percent of monomer) of 2,2'-azobis(2,4-dimethyl-4-methoxyvaleronitrile) in 35 parts of N,N-dimethyl-formamide was stirred under an inert atmosphere at 30° C. for 48 hrs. The reaction mixture was poured into methanol to precipitate 9.7 parts of polymer. The thermoplastic polymer had a weight average molecular weight of about 100,000 and a $T_g$ of 56° C.

The 2-N-indolinoethyl methacrylate was prepared as follows:

To a stirred mixture containing 10 parts of 2-hydroxyethyl indoline, 11 parts of triethylamine and 100 parts of methylene chloride was slowly added 10 parts of methacryloyl chloride at room temperature. After 8 hrs., 100 parts of saturated aqueous sodium bicarbonate was added to the mixture. The organic phase was separated, washed with water and dried over anhydrous calcium chloride. By chromatography using a silica gel column and 80 percent hexane—20 percent ethyl acetate as eluent, 8.5 parts of pure product was obtained; proton and carbon-13 NMR spectra were consistent with structure.

EXAMPLE 2

Polymer of 2-N-(N-ethylanilino)ethyl methacrylate

Following the general procedure of Example 1, from 20 parts of 2-N-(N-ethylanilino)ethyl methacrylate and 0.053 part of 2,2'-azobis(2,4-dimethyl-4-methoxyvaleronitrile) (0.2 mole percent of monomer) there was obtained 15.3 parts of polymer. The polymer had a weight average molecular weight of about 110,000 and a $T_g$ of 50° C.

EXAMPLE 3

Copolymer of 2-N-indolinoethyl methacrylate with methyl methacrylate

Following the general procedure of Example 1, from 8.7 parts of a monomer mixture containing 50 mole percent of 2-N-indolinoethyl methacrylate and 50 mole percent of methyl methacrylate, there was obtained 7.0 parts of a copolymer which contained 53 mole percent of 2-N-indolinoethyl methacrylate unit. The thermoplastic copolymer had a weight average molecular weight of about 120,000 and a $T_g$ of 67° C.

EXAMPLES 4–7.

Following the general procedure of Example 1, monomer mixtures containing various mole percents of 2-N-indolinoethyl methacrylate and methyl methacrylate were copolymerized to obtain copolymers which containing various amounts of 2-N-indolinoethyl methacrylate units. The results are summarized in Table I below.

TABLE I

Copolymers of 2-N-Indolinoethyl Methacrylate (IM) with Methyl Methacrylate (MM)

| Ex. | IM in Monomer (Mole %) | IM in Polymer (Mole %) | Wt. Avg. Mol. Wt. × $10^3$ | $T_g$ (°C.) |
|---|---|---|---|---|
| 4 | 20 | 19 | 157 | 95 |
| 5 | 40 | 38 | 125 | 78 |
| 6 | 60 | 65 | 120 | 65 |
| 7 | 80 | 75 | 110 | 57 |

EXAMPLES 8–11

Following the general procedure of Example 1, monomer mixtures containing various mole percents of 2-N-(N-ethylanilino)ethyl methacrylate and methyl methacrylate were copolymerized to obtain copolymer containing various mole percents of the 2-N-(N-ethylanilino)ethyl methacrylate unit. The results are summarized in Table II below.

TABLE II

Copolymers of 2-N-(N-ethylanilino)ethyl Methacrylate (EEM) with Methyl Methacrylate (MM)

| Ex. | EEM in Monomer (Mole %) | EEM in Polymer (Mole %) | Wt. Avg. Mol. Wt. × $10^3$ | $T_g$ (°C.) |
|---|---|---|---|---|
| 8 | 20 | 17 | 150 | 85 |
| 9 | 40 | 40 | 145 | 66 |
| 10 | 60 | 54 | 135 | 55 |
| 11 | 80 | 76 | 130 | 45 |

EXAMPLE 12

Preparation of 2-hydroxy-4-nitrobenzenediazonium tosylate

Five parts of 2-amino-5-nitro-phenol and 12.5 parts of p-toluene sulfuric acid monohydrate were dissolved in 300 parts of methanol and then diazotized with 3.9 parts of isoamyl nitrite. The solution was filtered and the filtrate was poured into 700 parts of ethyl ether. The precipitate was collected, washed with ethyl ether and dried under vacuum to give 7.7 parts of 2-hydroxy-4-nitrobenzenediazonium tosylate with purity >95.

EXAMPLE 13

Preparation of 4-cyanobenzenediazonium tosylate

Following the procedure in Example 12, from 2.3 parts of 4-aminobenzonitrile and 4 parts of p-toluenesulfonic acid monohydrate was obtained 4.3 parts of pure 4-cyanophenyldiazonium tosylate.

EXAMPLE 14

Preparation of 2-hydroxy-4-carbomethoxybenzene diazonium tosylate

Following the procedure in Example 12, from 1.7 parts of methyl 4-amino-3-hydroxyl benzoate and 3.8 parts of p-toluenesulfonic acid monohydrate was obtained 3.1 parts of product, its proton NMR was consistent with the assigned structure.

EXAMPLE 15

Preparation of 2-hydroxy-4-carbo(n-octyl)oxybenzene diazonium tosylate

Following the procedure in Example 12, from 2.7 parts of n-octyl 4-amino-3-hydroxyl benzoate and 3.8 parts of p-toluenesulfonic acid monohydrate is obtained the above product which proton NMR is consistent with the assigned structure.

EXAMPLE 16

Preparation of 2-hydroxy-4-carbo(cyclo-hexyl)oxybenzene diazonium tosylate

Following the procedure in Example 12, from cyclohexyl 4-amino-3-hydroxyl benzoate the above product is obtained, which proton NMR is consistent with the assigned structure.

EXAMPLE 17

Preparation of 2-hydroxy-4-carbo(t-butyl)oxybenzene diazonium tosylate

Following the procedure in Example 12, from t-butyl 4-amino-3-hydroxyl benzoate the above product is obtained, which proton NMR is consistent with the assigned structure.

EXAMPLE 18

Preparation of 2-hydroxy-4-nitrobenzene diazonium triflate

To an ice cooled solution containing 5 parts of 2-amino-5-nitrophenol and 9.6 parts of trifluoromethane sulfonic acid in 150 parts of methanol was slowly added 3.9 parts of isoamyl nitrite to complete diazotization. The solution was filtered and the filtrate was poured into 700 parts of ethyl ether. The precipitate was collected, washed with ether and dried under vacuum to give 4.5 parts of product with purity >95%.

EXAMPLE 19

Preparation of 4-(dicyanovinyl)benzenediazonium triflate

Following the procedure in Example 18, from 4-(dicyanovinyl)aniline and trifluoromethanesulfonic acid the above product is obtained. Proton NMR is consistent with the assigned structure.

EXAMPLE 20

Preparation of 2-hydroxy-4-(dicyanovinyl)benzenediazonium triflate

Following the procedure in Example 18, from 2-hydroxy-4-(dicyanovinyl)aniline and trifluoromethanesulfonic acid the above product is obtained, proton NMR is consistent with the assigned structure.

EXAMPLE 21

Preparation of 4-(tricyanovinyl)benzenediazonium triflate

Following the procedure in Example 18, from 4-(tricyanovinyl)aniline and trifluoromethanesulfonic acid the above product is obtained, proton NMR is consistent with the assigned structure.

EXAMPLE 22

Preparation of 4-nitrobenzene diazonium triflate

Following the procedure in Example 18, from 4.5 parts of 4-nitroaniline and 9.6 parts of trifluoromethane sulfonic acid was obtained 4.6 parts of product with purity >95%.

EXAMPLE 23

Preparation of 4-nitrobenzene diazonium methylsulfonate

Following the procedure in Example 18, from 4.5 parts of 4-nitroaniline and 6.5 parts of methane sulfonic acid was obtained 5.8 parts of product.

EXAMPLE 24

Preparation of

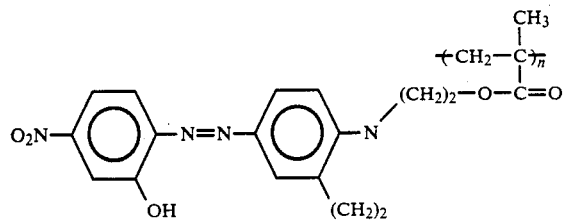

To a stirred solution of 1.5 parts of homopolymer of 2-N-indolino-ethyl methacrylate (Example 1) in 4.5 parts of N,N-dimethylformamide at $-10°$ C. was slowly added 3.5 parts (1.5 equivalents) of 2-hydroxy-4-nitrobenzene diazonium tosylate in 30 parts of N,N-dimethylformamide. After 2 hrs., the reaction mixture was poured into 500 parts of methanol. The precipitate was collected, washed with methanol and dried in vacuum to give 1.6 parts of a polymer in which the phenyl ring was 90 mole percent diazo-coupled. The polymer had a $T_g$ of 115° C. and completely dissolved in N,N-dimethylformide. This polymer was redissolved in 20 parts of N,N-dimethylformamide and reacted with 0.8 part of 2-hydroxy-4-nitrobenzene diazonium tosylate at $-10°$ C. for 3 hrs. to give 1.5 parts of polymer which was completely coupled.

EXAMPLE 25

Preparation of

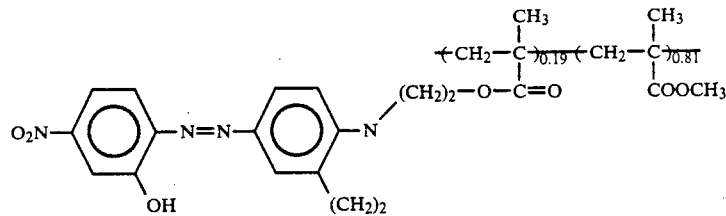

Following the general procedure of Example 24, from a copolymer containing 19 mole percent of 2-N-indolinoethyl methacrylate and 81 mole percent of methyl methacrylate (Example 4) and 2-hydroxy-4-nitrobenzene diazonium triflate (1.2 equivalents) was obtained a copolymer which was 70 mole percent diazo-coupled. Second treatment with the same diazonium salts gave copolymer almost 100 percent coupled which had a $T_g$ of 115° C.

EXAMPLE 26

Preparation of

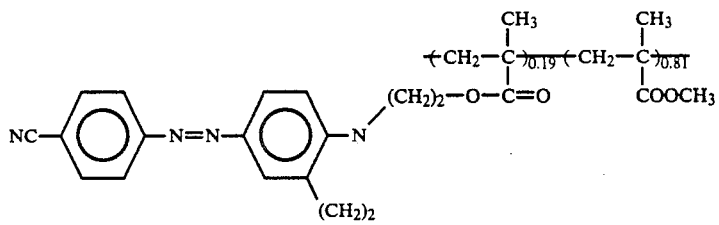

Following the general procedure of Example 24, from a copolymer containing 19 mole percent of 2-N-indolinoethyl methacrylate and 81 mole percent of methyl methacrylate (Example 4) and 4-cyanobenzenediazonium tosylate (1.3 equivalents) from Example 13 reacted at −20° C. for 64 hrs. was obtained a linear copolymer which from proton NMR was 96 mole percent diazo-coupled and had a $T_g$ of 120° C. UV max (film) of the copolymer was at 460 nm. The characteristic 2220 cm$^{-1}$ peak of cyano group was evident in IR.

EXAMPLE 27

Preparation of

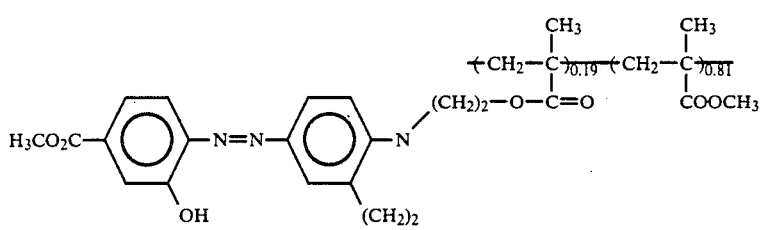

Following the general procedure of Example 24, from a copolymer containing 19 mole percent of 2-N-indolinoethyl methacrylate and 81 mole percent of methyl methacrylate (Example 4) and 2-hydroxy-4-carbomethoxybenzene diazonium tosylate (1.2 equivalents) from Example 14 reacted at −10° C. for 42 hrs. was obtained a linear copolymer which from proton NMR was almost 100 percent diazo-coupled and had a $T_g$ of 118° C.

EXAMPLE 28

Preparation of

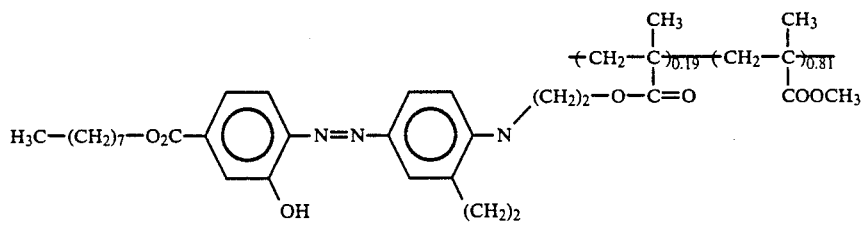

Following the general procedure of Example 24, from a copolymer containing 19 mole percent of 2-N-indolinoethyl methacrylate and 81 mole percent of methyl methacrylate (Example 4) and 2-hydroxy-4-carbo(n-octyl)oxybenzene diazonium tosylate (1.2 equivalents) from Example 15 reacted at −10° C. for 48 hrs. is obtained a linear copolymer, the proton NMR is consistent with the assigned structure.

EXAMPLE 29

Preparation of

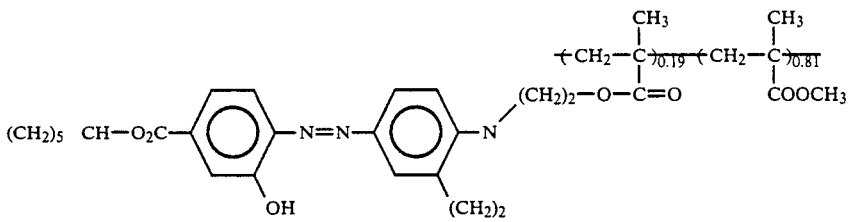

Following the general procedure of Example 24, from a copolymer containing 19 mole percent of 2-N-indolinoethyl methacrylate and 81 mole percent of methyl methacrylate (Example 4) and 2-hydroxy-4-carbo(cyclohexyl)oxybenzene diazonium tosylate (1.2 equivalents) from Example 16 reacted at −10° C. for 48 hrs. is obtained a linear copolymer, the proton NMR is consistent with the assigned structure.

EXAMPLE 30

Preparation of

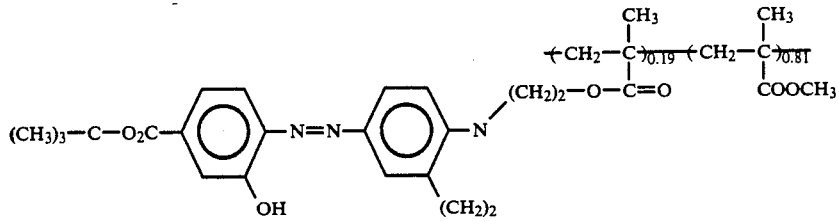

Following the general procedure of Example 24, from a copolymer containing 19 mole percent of 2-N-indolinoethyl methacrylate and 81 mole percent of methyl methacrylate and 2-hydroxy-4-carbo(t-butyl-)oxybenzene diazonium tosylate (1.2 equivalents) from Example 17 reacted at −10° C. for 48 hrs. is obtained a linear copolymer, the proton NMR is consistent with the assigned structure.

EXAMPLE 31

Preparation of

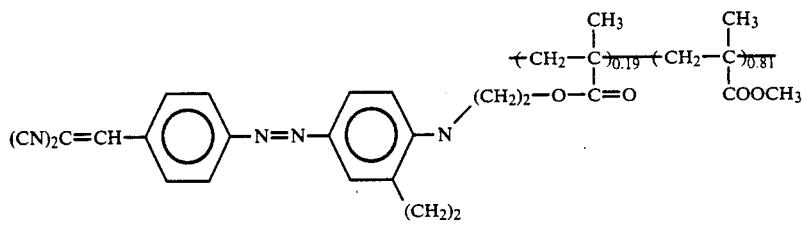

Following the general procedure of Example 24, from a copolymer containing 20 mole percent of 2-N-indolinoethyl methacrylate and 80 mole percent of methyl methacrylate and 4-(dicyanovinyl)benzene diazonium triflate (1.1 equivalents) from Example 19 reacted at −20° C. for 48 hrs. is obtained a linear copolymer, the proton NMR is consistent with the assigned structure.

EXAMPLE 32

Preparation of

Following the general procedure of Example 24, from a copolymer containing 19 mole percent of 2-N-indolinoethyl methacrylate and 81 mole percent of methyl methacrylate and 2-hydroxy-4-(dicyanovinyl)-benzene diazonium triflate (1.1 equivalents) from Example 20 reacted at -20° C. for 48 hrs. is obtained a linear copolymer, the proton NMR is consistent with the assigned structure.

EXAMPLE 33

Preparation of

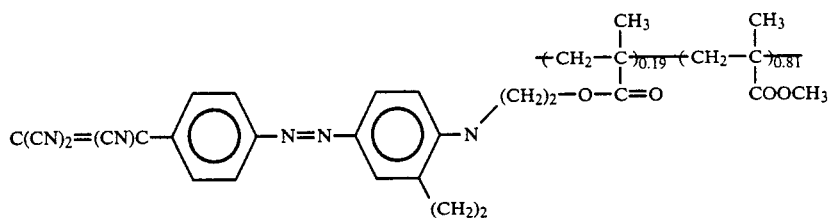

Following the general procedure of Example 24, from a copolymer containing 19 mole percent of 2-N-indolinoethyl methacrylate and 81 mole percent of methyl methacrylate and 4-(tricyanovinyl)benzene diazonium triflate (1.1 equivalents) from Example 21 reacted at −20° C. for 48 hrs. is obtained a linear copolymer, the proton NMR is consistent with the assigned structure.

EXAMPLE 34

Preparation of

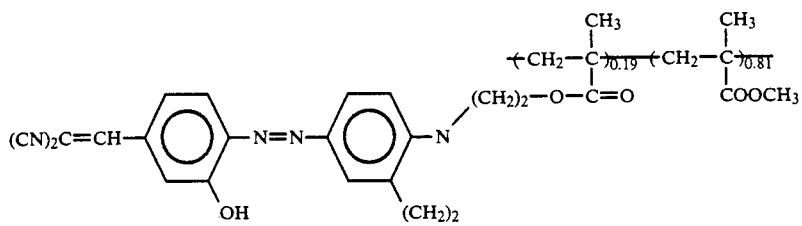

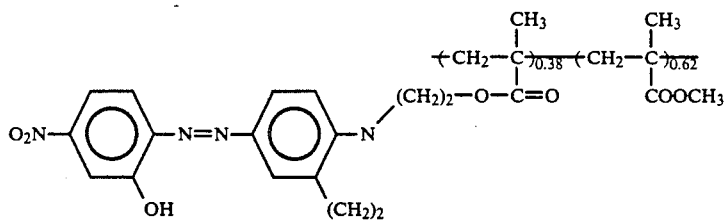

Following the general procedure of Example 24, from a copolymer containing 38 mole percent of 2-N-indolinoethyl methacrylate and 62 mole percent of methyl methacrylate (Example 5) and 2-hydroxy-4-nitrobenzene diazonium triflate (1.5 equivalents) Was obtained a copolymer which was 95 mole percent diazo-coupled. Second treatment with the same diazonium salts gave copolymer almost 100 percent coupled which had a $T_g$ of 115° C.

EXAMPLE 35

Preparation of

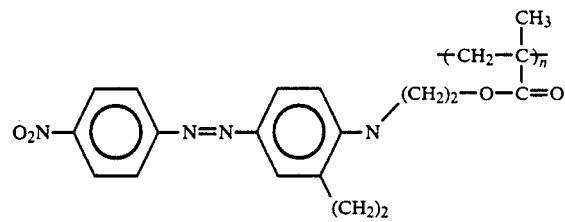

Following the general procedure of Example 24, from a homopolymer of 2-N-indolinoethyl methacry-

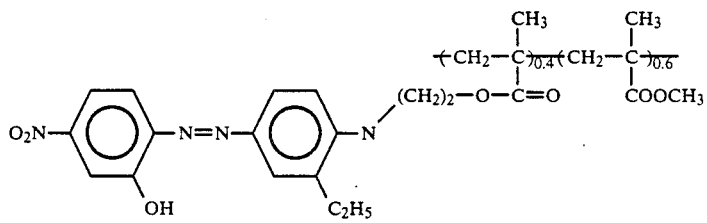

Following the general procedure of Example 24, from a copolymer containing 40 mole percent of 2-N-(N-ethylanilino)ethyl methacrylate and 60 mole percent of methyl methacrylate (Example 9) and 1.2 equivalents of 2-hydroxy-4-nitrobenzenediazonium tosylate reacted at −10° C. for 48 hrs. is obtained a linear copolymer, its proton NMR is consistent with the assigned structure.

EXAMPLE 36

Preparation of

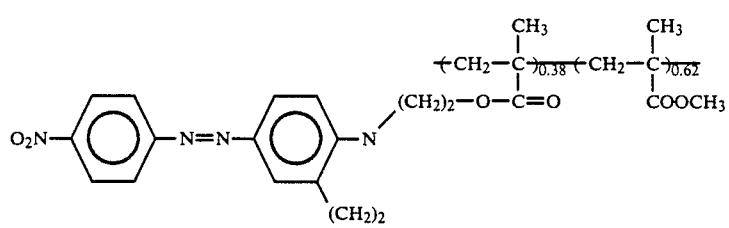

Following the general procedure of Example 24, from a copolymer containing 38 mole percent of 2-N-indolinoethyl methacrylate and 62 mole percent of methyl methacrylate (Example 5) and 1.5 equivalent of 4-nitrobenzene diazonium methyl sulfonate was obtained a polymer which was 70 mole percent diazo-coupled. Second treatment with the same diazonium salts gave a polymer which was almost 100 percent coupled and had a $T_g$ of 120° C.

EXAMPLE 37

Preparation of late (Example 1) and 1.5 equivalent of 4-nitrobenzene diazonium triflate was obtained a polymer which was 78 mole percent diazo-coupled. Second treatment with the same diazonium salts gave a polymer which was almost 100 percent coupled and had a $T_g$ of 120° C.

Since various changes may be made in the invention without departing from its spirit and essential characteristics, it is intended that all matter contained in the description shall be interpreted as illustrative only and not in a limiting sense, the scope of the invention being defined by the appended claims.

I claim:

1. The method for making optically active polymers composed of a carbon-carbon backbone chain having the general formula:

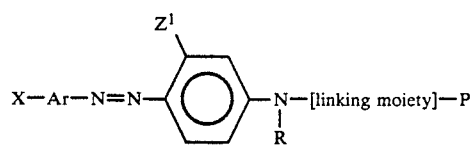

wherein X, Ar, $Z^1$, R, [linking moiety], and P have the meanings set forth below, which comprises reacting in homogeneous solution in an aprotic polar solvent a polymer having the general composition [terminal moiety]—[linking moiety]—P wherein
(a) P represents a polymeric carbon-carbon backbone chain having the structure

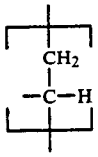 (1)

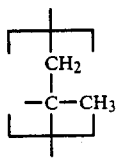 (2)

and (3) units of (1) or (2), above, copolymerized with
(i) alkyl acrylate wherein the alkyl moiety contains from about 1-5 carbons,
(ii) alkyl methacrylate wherein the alkyl moiety contains from about 1-5 carbons,
(iii) acryl amide,
(iv) methacryl amide, and
(v) styrene;
(b) the linking moiety is
(1) —(CH$_2$)$_m$—,
(2) —(CH$_2$)$_m$—O—
(3)

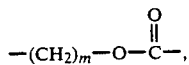

(4) —(CH$_2$)$_m$—O—CH$_2$— or
(5)

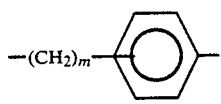

wherein m is an integer of from about 1-20; and
(c) the terminal moiety is

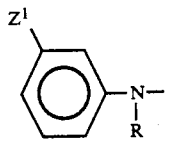

wherein
(1) $Z^1$ is H or OH,
(2) R is
(i) H,
(ii) alkyl, straight chain, branched or cyclic, having 1-20 carbon atoms,
(iii) —C$_n$H$_{2n}$OH wherein n is an integer of from about 1-20, or (iv) an alkylene bridging group having 2 to 4 carbon atoms connecting the N atom to the o- position of the aromatic ring to which the N atom is attached, with a diazonium salt having the general formula

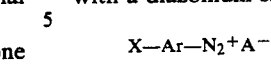

wherein
(a) X is
(1) —NO$_2$,
(2) —CN,
(3) —COOR$^3$ wherein R$^3$ is alkyl, straight chain, cyclic or branched having 1-20 carbon atoms,
(4) —CH=C(CN)$_2$, or
(5) —C(CN)=C(CN)$_2$;
(b) Ar is selected from the group consisting of

 (1)

wherein $Z^2$ is
(i) —H,
(ii) —OH, or
(iii) alkyl, straight chain, branched or cyclic, having from about 1-20 carbon atoms,

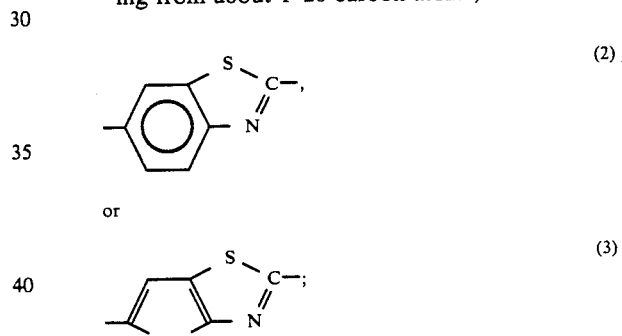

(c) A$^-$ is the conjugate base of an organic strong acid or superacid HA which is:
(1) substituted sulfonic acid R$^5$SO$_3$H wherein R$^5$ is
(i) —CH$_3$,
(ii) —CH$_2$(CF$_2$)$_n$F wherein n is an integer of from about 1-10, or
(iii) —(CF$_2$)$_n$F wherein n is an integer of from 1-10;
(2) substituted benzenesulfonic acid

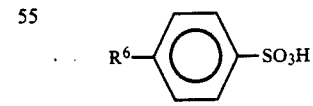

wherein R$^6$ is
(i) —CH$_3$,
(ii) —Cl,
(iii) —Br, or
(iv) —NO$_2$;
followed by recovering the desired reaction product from the reaction mixture.

2. The method of claim 1, wherein the reaction is carried out in homogeneous solution in aprotic solvent.

3. The method of claim 2, wherein the reaction is carried out in solution in a solvent selected from the group consisting of N,N-dimethylacetamide, N,N-dimethylformamide, benzonitrile, nitrobenzene and dichlorobenzene.

4. The method of any one of claims 1 through 3, wherein Ar in the diazonium salt is

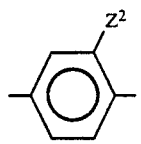

wherein $Z^2$ has the aforestated meaning.

5. The method of any one of claims 1 through 3, wherein Ar in the diazonium salt reactant is

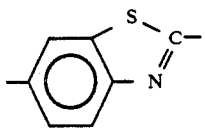

6. The method of any one of claims 1 through 3, wherein Ar in the diazonium salt reactant is

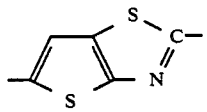

7. The method of claim 1, wherein the desired reaction product is recovered by mixing the reaction solvent with an inert non-solvent for the desired reaction product to precipitate the reaction product followed by separating liquid and solid phases.

* * * * *